(12) United States Patent
Garces et al.

(10) Patent No.: US 11,407,142 B2
(45) Date of Patent: Aug. 9, 2022

(54) TABLE SAW

(71) Applicant: MILWAUKEE ELECTRIC TOOL CORPORATION, Brookfield, WI (US)

(72) Inventors: Daniel R. Garces, Waukesha, WI (US); Travis Mergener, Horicon, WI (US); Zhi Bin Li, Dongguan (CN); Hai Feng Jiang, Dongguan (CN); Daryl S. Richards, Sussex, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/008,845

(22) Filed: Sep. 1, 2020

(65) Prior Publication Data
US 2020/0391404 A1 Dec. 17, 2020

Related U.S. Application Data

(63) Continuation of application No. 15/947,985, filed on Apr. 9, 2018, now Pat. No. 10,792,834.

(30) Foreign Application Priority Data

Jun. 5, 2017 (CN) .......................... 201720642344.1

(51) Int. Cl.
*B27G 19/08* (2006.01)
*B27G 19/02* (2006.01)
*B23D 45/06* (2006.01)

(52) U.S. Cl.
CPC ............. *B27G 19/08* (2013.01); *B23D 45/06* (2013.01); *B23D 45/068* (2013.01); *B27G 19/02* (2013.01);
(Continued)

(58) Field of Classification Search
CPC ...... B23D 45/06; B23D 45/068; B27G 19/08; B27G 19/02; B27B 5/38; Y10T 83/773; Y10T 83/2077; Y10T 83/7734
See application file for complete search history.

(56) References Cited

U.S. PATENT DOCUMENTS

| 1,496,212 A | 6/1924 | French |
| 1,570,628 A | 1/1926 | Flohr |

(Continued)

FOREIGN PATENT DOCUMENTS

| CN | 2686797 | 3/2005 |
| CN | 2756419 | 2/2006 |

(Continued)

OTHER PUBLICATIONS

Extended European Search Report for Application No. 18812986.0 dated Feb. 5, 2021 (15 pages).
(Continued)

*Primary Examiner* — Laura M Lee
(74) *Attorney, Agent, or Firm* — Michael Best & Friedrich LLP

(57) ABSTRACT

A table saw includes a table, a saw unit movably coupled underneath the table, a riving knife extending through the table, and a quick-release assembly selectively coupling the riving knife to the table. The quick-release assembly includes a mounting plate coupled to the table and a clamping plate movable relative to the mounting plate between a clamping position, in which the riving knife is clamped between the mounting plate and the clamping plate to secure the riving knife to the table, and a release position, in which the riving knife is releasable from the table. The quick-release assembly further includes a pin coupled for movement with the clamping plate and a handle pivotably coupled to the pin. The pin has a cam portion engageable with the saw unit. The clamping plate is movable between the (Continued)

clamping position and the release position in response to pivoting movement of the handle.

16 Claims, 12 Drawing Sheets

(52) U.S. Cl.
CPC .......... *Y10T 83/2077* (2015.04); *Y10T 83/773* (2015.04); *Y10T 83/7734* (2015.04)

(56) References Cited

U.S. PATENT DOCUMENTS

| | | |
|---|---|---|
| 1,649,060 A | 11/1927 | Decker |
| 1,672,238 A * | 6/1928 | Wallace ................ B27G 19/04 83/564 |
| 2,211,216 A | 8/1940 | Oster |
| 2,466,325 A | 4/1949 | Ocenasek |
| 2,731,049 A | 1/1956 | Akin |
| 2,806,493 A | 9/1957 | Gaskell |
| 2,808,084 A | 10/1957 | Eschenburg et al. |
| 2,993,518 A * | 7/1961 | Hugow ................ B27G 19/04 30/375 |
| 3,013,592 A | 12/1961 | Ambrosio et al. |
| 3,105,530 A | 10/1963 | Peterson |
| 3,229,735 A | 1/1966 | Parmelee |
| 3,249,134 A | 5/1966 | Vogl et al. |
| 3,872,951 A | 3/1975 | Hastings, Jr. |
| 3,880,036 A | 4/1975 | Yokoyama |
| 3,899,852 A | 8/1975 | Batson |
| 4,179,632 A | 12/1979 | Harvell |
| 4,206,672 A | 6/1980 | Smith |
| 4,206,910 A | 6/1980 | Biesemeyer |
| 4,270,427 A | 6/1981 | Colberg et al. |
| 4,276,799 A | 7/1981 | Muehling |
| 4,336,733 A | 6/1982 | Macksoud |
| 4,385,539 A | 5/1983 | Meyerhoefer et al. |
| 4,400,995 A * | 8/1983 | Palm ................ B24B 23/02 81/464 |
| 4,434,586 A * | 3/1984 | Muller ................ B24B 45/006 451/342 |
| 4,467,896 A | 8/1984 | Sauerwein et al. |
| 4,489,525 A | 12/1984 | Heck |
| 4,521,006 A | 6/1985 | Waters |
| 4,566,510 A | 1/1986 | Bartlett et al. |
| 2,744,549 A | 5/1986 | Johnson |
| 4,593,590 A | 6/1986 | Gray |
| 4,599,927 A | 7/1986 | Eccardt et al. |
| 4,600,184 A | 7/1986 | Ashworth |
| 4,658,687 A | 4/1987 | Haas et al. |
| 4,690,252 A | 9/1987 | Kottke et al. |
| D293,983 S | 2/1988 | Aldridge, Sr. |
| 4,805,505 A | 2/1989 | Cantlin |
| 4,846,036 A | 7/1989 | Metzger et al. |
| 4,909,491 A | 3/1990 | Cheng |
| 4,969,496 A | 11/1990 | Romans |
| 4,976,251 A | 12/1990 | Smith |
| 5,018,562 A | 5/1991 | Adams |
| 5,018,563 A | 5/1991 | Yoder |
| 5,022,188 A | 6/1991 | Borst |
| 5,116,249 A | 5/1992 | Shiotani |
| 5,158,001 A | 10/1992 | Udelhofen et al. |
| 5,159,864 A | 11/1992 | Wedemeyer et al. |
| 5,161,590 A | 11/1992 | Otto |
| 5,174,349 A | 12/1992 | Svetlik et al. |
| 5,289,897 A | 3/1994 | Wiehe, Jr. |
| 5,320,150 A | 6/1994 | Everts et al. |
| 5,430,944 A | 7/1995 | Shilling |
| 5,439,073 A | 8/1995 | Johnson |
| 5,460,070 A | 10/1995 | Buskness |
| 5,542,639 A | 8/1996 | Wixey et al. |
| 5,619,896 A | 4/1997 | Chen |
| 5,722,308 A | 3/1998 | Ceroll et al. |
| 5,766,062 A | 6/1998 | Edling |
| 5,778,953 A | 7/1998 | Braddock |
| 5,794,351 A | 8/1998 | Campbell et al. |
| 5,819,625 A | 10/1998 | Sberveglieri |
| 5,822,864 A | 10/1998 | Campbell et al. |
| 5,857,507 A | 1/1999 | Puzio et al. |
| 5,887,489 A | 3/1999 | Zerrer |
| 5,911,482 A | 6/1999 | Campbell et al. |
| 5,927,857 A | 7/1999 | Ceroll et al. |
| 5,970,835 A | 10/1999 | Kenyon et al. |
| 5,979,523 A | 11/1999 | Puzio et al. |
| 6,009,782 A | 1/2000 | Tajima et al. |
| 6,062,121 A | 5/2000 | Ceroll et al. |
| 6,070,229 A | 5/2000 | Voss |
| 6,076,445 A | 6/2000 | Kenyon et al. |
| 6,109,157 A | 8/2000 | Talesky |
| 6,131,629 A | 10/2000 | Puzio et al. |
| 6,148,703 A | 11/2000 | Ceroll et al. |
| 6,161,459 A | 12/2000 | Ceroll et al. |
| 6,170,370 B1 | 1/2001 | Sommerville |
| 6,182,935 B1 | 2/2001 | Talesky |
| 6,237,230 B1 | 5/2001 | Campbell et al. |
| 6,244,149 B1 | 6/2001 | Ceroll et al. |
| 6,250,190 B1 | 6/2001 | Ceroll et al. |
| 6,276,064 B1 | 8/2001 | Campbell |
| 6,314,893 B1 | 11/2001 | Lee |
| 6,357,328 B1 | 3/2002 | Ceroll et al. |
| 6,360,641 B1 | 3/2002 | Talesky et al. |
| 6,360,797 B1 | 3/2002 | Brazell et al. |
| 6,400,599 B1 | 6/2002 | Voss |
| 6,422,116 B1 | 7/2002 | Kenyon et al. |
| 6,431,042 B1 | 8/2002 | Brault et al. |
| 6,435,460 B1 | 8/2002 | Van Cleave et al. |
| 6,450,077 B1 | 9/2002 | Ceroll et al. |
| 6,453,786 B1 | 9/2002 | Ceroll et al. |
| 6,460,442 B2 | 10/2002 | Talesky et al. |
| 6,485,360 B1 | 11/2002 | Hutchins |
| 6,502,316 B2 | 1/2003 | Campbell et al. |
| 6,502,493 B1 | 1/2003 | Eccardt et al. |
| 6,530,303 B1 | 3/2003 | Parks et al. |
| 6,575,067 B2 | 6/2003 | Parks et al. |
| 6,578,461 B1 | 6/2003 | Loo |
| 6,578,856 B2 | 6/2003 | Kahle |
| 6,595,096 B2 | 7/2003 | Ceroll et al. |
| 6,675,685 B2 | 1/2004 | Ceroll et al. |
| D486,504 S | 2/2004 | Huang |
| 6,688,202 B2 | 2/2004 | Parks et al. |
| 6,722,618 B1 | 4/2004 | Wu |
| 6,725,755 B1 | 4/2004 | Svetlik |
| 6,736,042 B2 | 5/2004 | Behne et al. |
| 6,745,804 B2 | 6/2004 | Welsh et al. |
| 6,780,093 B2 | 8/2004 | Krondorfer et al. |
| 6,786,122 B2 | 9/2004 | Svetlik |
| 6,796,208 B1 | 9/2004 | Jorgensen |
| 6,820,524 B1 | 11/2004 | Ceroll et al. |
| 6,899,306 B1 | 5/2005 | Huang |
| 6,907,807 B2 | 6/2005 | Parks et al. |
| 6,942,229 B2 | 9/2005 | Brazell et al. |
| 6,974,370 B2 | 12/2005 | Hutchins |
| 6,986,370 B1 | 1/2006 | Schoene et al. |
| 6,994,006 B2 | 2/2006 | Ceroll et al. |
| 7,036,414 B2 | 5/2006 | Behne et al. |
| 7,036,540 B2 | 5/2006 | Welsh et al. |
| 7,052,384 B2 | 5/2006 | Wolf et al. |
| 7,066,069 B2 | 6/2006 | Ku et al. |
| 7,077,421 B2 | 7/2006 | Wu |
| 7,084,779 B2 * | 8/2006 | Uneyama ................ B27B 5/38 340/679 |
| 7,086,434 B2 | 8/2006 | Lee |
| 7,128,641 B1 | 10/2006 | Lin |
| 7,131,364 B2 | 11/2006 | Brazell |
| 7,137,327 B2 | 11/2006 | Garcia et al. |
| 7,175,513 B2 | 2/2007 | Folin |
| 7,191,692 B2 | 3/2007 | Huang |
| 7,210,386 B1 | 5/2007 | Chang |
| 7,213,829 B2 | 5/2007 | Wu |
| 7,234,380 B2 | 6/2007 | Garcia |
| 7,243,896 B2 | 7/2007 | Zhang |
| 7,261,025 B2 | 8/2007 | Wong |
| 7,263,922 B2 | 9/2007 | Hewitt et al. |

(56) References Cited

U.S. PATENT DOCUMENTS

| | | | |
|---|---|---|---|
| 7,267,038 B2 | 9/2007 | Parks et al. |
| 7,278,646 B2 | 10/2007 | Chuang |
| 7,287,453 B2 | 10/2007 | Kuo |
| 7,293,488 B2 | 11/2007 | Wang |
| 7,299,730 B2 | 11/2007 | Hummel |
| 7,302,878 B2 | 12/2007 | Chang |
| 7,322,266 B2 | 1/2008 | Lin |
| 7,343,840 B2 | 3/2008 | Liu et al. |
| 7,373,863 B2 | 5/2008 | O'Banion et al. |
| 7,374,184 B2 | 5/2008 | Worthy |
| 7,437,981 B2 | 10/2008 | Burke et al. |
| 7,441,487 B2 | 10/2008 | Liu et al. |
| 7,441,760 B2 | 10/2008 | Zhang |
| 7,448,608 B2 | 11/2008 | Radermacher |
| 7,458,301 B2 * | 12/2008 | Yu .................. B27G 19/02 83/477.2 |
| 7,458,403 B2 | 12/2008 | Radermacher |
| 7,469,621 B2 | 12/2008 | Chen |
| 7,475,621 B2 | 1/2009 | Wang |
| 7,475,622 B1 | 1/2009 | Chang |
| 7,481,254 B2 | 1/2009 | Welsh et al. |
| 7,540,223 B2 | 6/2009 | Sasaki et al. |
| 7,543,614 B2 | 6/2009 | Wise |
| 7,546,790 B2 | 6/2009 | Parks et al. |
| 7,546,792 B2 | 6/2009 | Liu et al. |
| 7,587,967 B2 | 9/2009 | Bauer |
| 7,594,459 B2 | 9/2009 | Miller et al. |
| 7,600,456 B2 | 10/2009 | Burke et al. |
| 7,614,329 B2 | 11/2009 | Aigner |
| 7,617,754 B2 | 11/2009 | Lung et al. |
| 7,631,585 B2 | 12/2009 | Ichikawa et al. |
| 7,665,393 B2 | 2/2010 | O'Banion et al. |
| 7,681,893 B2 | 3/2010 | Liu et al. |
| 7,690,408 B2 | 4/2010 | Sugiura |
| 7,698,978 B2 | 4/2010 | Shibata |
| 7,757,999 B2 | 7/2010 | Zhang |
| 7,784,385 B2 | 8/2010 | Wang |
| 7,806,032 B2 | 10/2010 | Weir et al. |
| 7,814,818 B2 | 10/2010 | Domeny et al. |
| 7,827,889 B2 | 11/2010 | Carrier |
| 7,827,890 B2 | 11/2010 | Gass et al. |
| 7,827,893 B2 | 11/2010 | Gass et al. |
| 7,866,236 B2 | 1/2011 | Gass et al. |
| 7,866,239 B2 | 1/2011 | Gass et al. |
| 7,882,870 B2 | 2/2011 | Lee |
| 7,891,278 B2 | 2/2011 | Liu et al. |
| 7,891,389 B2 | 2/2011 | Welsh et al. |
| 7,921,755 B2 | 4/2011 | Weston et al. |
| 7,930,960 B2 | 4/2011 | Duginske |
| 7,971,512 B2 | 7/2011 | Tanaka |
| 7,980,325 B2 | 7/2011 | Botefuhr et al. |
| 7,988,538 B2 | 8/2011 | Trautner et al. |
| 7,997,176 B2 | 8/2011 | Gass et al. |
| 8,006,596 B2 | 8/2011 | Schwaiger et al. |
| 8,011,444 B2 | 9/2011 | Pyles et al. |
| 8,042,794 B2 | 10/2011 | Marshall et al. |
| 8,047,242 B2 | 11/2011 | Wall et al. |
| 8,096,220 B2 | 1/2012 | Weir et al. |
| 8,096,519 B2 | 1/2012 | Tam et al. |
| 8,104,386 B2 | 1/2012 | Chen |
| 8,151,676 B2 | 4/2012 | Shibata et al. |
| 8,186,256 B2 | 5/2012 | Carrier |
| 8,205,533 B2 | 6/2012 | Tanaka |
| 8,215,215 B2 | 7/2012 | Chuang |
| 8,231,119 B2 | 7/2012 | Marshall et al. |
| 8,234,959 B2 | 8/2012 | Janson |
| 8,235,139 B2 | 8/2012 | Chen et al. |
| 8,245,614 B2 | 8/2012 | Weston et al. |
| 8,246,059 B2 | 8/2012 | Gass et al. |
| 8,256,477 B2 | 9/2012 | Welsh et al. |
| 8,266,997 B2 | 9/2012 | Gass et al. |
| 8,272,305 B2 | 9/2012 | Xu et al. |
| 8,312,799 B2 | 11/2012 | Frovlov |
| 8,376,307 B2 | 2/2013 | Frovlov |
| 8,388,417 B2 | 3/2013 | Trautner et al. |
| 8,408,107 B2 | 4/2013 | Carrier et al. |
| 8,413,560 B2 | 4/2013 | Liao |
| 8,418,591 B2 | 4/2013 | Frolov |
| 8,424,434 B2 | 4/2013 | Koegel et al. |
| 8,464,994 B2 | 6/2013 | Chiu |
| 8,474,358 B2 | 7/2013 | Doumani et al. |
| 8,505,424 B2 | 8/2013 | Gass et al. |
| 8,517,413 B2 | 8/2013 | Chen |
| 8,579,320 B2 | 11/2013 | Chiu |
| 8,584,564 B2 | 11/2013 | Welsh et al. |
| 8,601,926 B2 | 12/2013 | Frolov |
| 8,616,104 B2 | 12/2013 | Frolov et al. |
| 8,646,369 B2 | 2/2014 | Gass et al. |
| 8,726,776 B2 | 5/2014 | O'Banion et al. |
| 8,967,027 B2 | 3/2015 | Koegel |
| 8,991,806 B2 | 3/2015 | Meyer |
| 9,095,989 B2 | 8/2015 | Chang |
| 9,149,926 B2 | 10/2015 | Chen |
| 9,156,486 B2 | 10/2015 | Liu et al. |
| 9,186,734 B2 | 11/2015 | Chang |
| 9,186,736 B1 | 11/2015 | Chang |
| 9,216,518 B2 | 12/2015 | Frovlov |
| 9,254,580 B2 | 2/2016 | Frolov |
| 9,267,644 B2 | 2/2016 | Carrier et al. |
| 9,272,439 B2 | 3/2016 | Dammertz |
| 9,327,355 B2 | 5/2016 | Struss et al. |
| 9,333,638 B2 | 5/2016 | Powell et al. |
| 9,434,089 B2 | 9/2016 | Liu |
| 9,446,533 B2 | 9/2016 | O'Banion et al. |
| 9,533,410 B2 | 1/2017 | Chiang et al. |
| 9,573,292 B2 | 2/2017 | O'Banion et al. |
| 9,731,362 B2 | 8/2017 | Ceroll et al. |
| 9,776,260 B2 | 10/2017 | Welsh et al. |
| 9,776,262 B2 | 10/2017 | Wiker et al. |
| 9,969,099 B2 | 5/2018 | O'Banion et al. |
| 10,046,476 B2 | 8/2018 | Frolov |
| 10,118,308 B2 | 11/2018 | Gass et al. |
| 10,792,834 B2 * | 10/2020 | Garces .................. B27G 19/08 |
| 2001/0022027 A1 | 9/2001 | Campbell et al. |
| 2001/0047706 A1 | 12/2001 | Parks et al. |
| 2002/0020068 A1 | 2/2002 | Hartmann |
| 2002/0174755 A1 | 11/2002 | Behne et al. |
| 2002/0179181 A1 | 12/2002 | Murphy |
| 2002/0189417 A1 | 12/2002 | Liao et al. |
| 2003/0089212 A1 | 5/2003 | Parks et al. |
| 2004/0065181 A1 | 4/2004 | Chang |
| 2004/0107813 A1 | 6/2004 | Hewitt et al. |
| 2004/0118261 A1 | 6/2004 | Garcia et al. |
| 2004/0154449 A1 | 8/2004 | Parks et al. |
| 2004/0187666 A1 | 9/2004 | Huang |
| 2004/0226425 A1 | 11/2004 | Hewitt et al. |
| 2004/0231483 A1 | 11/2004 | Hewitt et al. |
| 2004/0250901 A1 | 12/2004 | Ursell et al. |
| 2004/0255745 A1 | 12/2004 | Peot et al. |
| 2004/0261591 A1 | 12/2004 | Liao et al. |
| 2005/0092149 A1 | 5/2005 | Hartmann |
| 2005/0092155 A1 | 5/2005 | Phillips et al. |
| 2005/0139056 A1 | 6/2005 | Gass et al. |
| 2005/0160895 A1 | 7/2005 | Garcia et al. |
| 2005/0172772 A1 | 8/2005 | Ceroll et al. |
| 2005/0194215 A1 | 9/2005 | Radermacher |
| 2005/0204884 A1 | 9/2005 | Huang |
| 2005/0211034 A1 | 9/2005 | Sasaki et al. |
| 2006/0011191 A1 | 1/2006 | Vavricek |
| 2006/0075862 A1 | 4/2006 | Parks et al. |
| 2006/0096428 A1 | 5/2006 | Garcia et al. |
| 2006/0101958 A1 | 5/2006 | Garcia et al. |
| 2006/0101966 A1 | 5/2006 | Garcia et al. |
| 2006/0101968 A1 | 5/2006 | Baird et al. |
| 2006/0130623 A1 | 6/2006 | Ceroll et al. |
| 2006/0144203 A1 | 7/2006 | Behen et al. |
| 2006/0201300 A1 | 9/2006 | Schwaiger et al. |
| 2006/0201302 A1 | 9/2006 | Schwaiger et al. |
| 2006/0219075 A1 | 10/2006 | Liu et al. |
| 2006/0219076 A1 | 10/2006 | Gass et al. |
| 2007/0000366 A1 | 1/2007 | Peot et al. |
| 2007/0034066 A1 | 2/2007 | Garcia et al. |
| 2007/0044614 A1 | 3/2007 | Chiu |
| 2007/0056416 A1 | 3/2007 | Shibata |

(56) References Cited

U.S. PATENT DOCUMENTS

| | | |
|---|---|---|
| 2007/0074612 A1 | 4/2007 | Yu |
| 2007/0079683 A1 | 4/2007 | Chen |
| 2007/0084323 A1 | 4/2007 | Parks et al. |
| 2007/0163408 A1 | 7/2007 | Buck et al. |
| 2007/0186739 A1 | 8/2007 | Peot et al. |
| 2007/0186741 A1 | 8/2007 | Buck et al. |
| 2007/0204733 A1 | 9/2007 | Garcia |
| 2007/0234865 A1 | 10/2007 | Spinelli et al. |
| 2007/0245869 A1 | 10/2007 | Welsh et al. |
| 2007/0272066 A1 | 11/2007 | Phillips et al. |
| 2007/0284890 A1 | 12/2007 | Guido |
| 2008/0006133 A1 | 1/2008 | Chuang |
| 2008/0014844 A1 | 1/2008 | Pontieri |
| 2008/0017004 A1 | 1/2008 | Parks et al. |
| 2008/0022825 A1 | 1/2008 | Spinelli et al. |
| 2008/0047410 A1 | 2/2008 | Chuang |
| 2008/0092710 A1 | 4/2008 | Chuang |
| 2008/0105815 A1 | 5/2008 | Chiu |
| 2008/0156162 A1 | 7/2008 | Chuang |
| 2008/0178722 A1 | 7/2008 | Gass et al. |
| 2008/0236355 A1 | 10/2008 | Gass et al. |
| 2008/0271583 A1 | 11/2008 | Chaung |
| 2008/0284081 A1 | 11/2008 | Smith |
| 2008/0289467 A1 | 11/2008 | Skillings et al. |
| 2008/0289469 A1 | 11/2008 | Chuang |
| 2009/0051097 A1 | 2/2009 | Chuang |
| 2009/0056514 A1 | 3/2009 | Chen |
| 2009/0084911 A1 | 4/2009 | Bergmann et al. |
| 2009/0084929 A1 | 4/2009 | Bergmann et al. |
| 2009/0095876 A1 | 4/2009 | Bergmann et al. |
| 2009/0120254 A1 | 5/2009 | Parks et al. |
| 2009/0158905 A1 | 6/2009 | Chuang |
| 2009/0165624 A1 | 7/2009 | Brown et al. |
| 2009/0223337 A1* | 9/2009 | Wikle ................. B23D 47/126 83/397 |
| 2009/0288303 A1 | 11/2009 | Liao |
| 2009/0293693 A1 | 12/2009 | Liao |
| 2010/0011929 A1 | 1/2010 | Lannelli, Sr. |
| 2010/0101388 A1 | 4/2010 | Chen |
| 2010/0101389 A1 | 4/2010 | Chiu |
| 2010/0101390 A1 | 4/2010 | Chiu |
| 2010/0101391 A1 | 4/2010 | Chiu |
| 2010/0101393 A1 | 4/2010 | Chen et al. |
| 2010/0107841 A1 | 5/2010 | Liu et al. |
| 2010/0126324 A1 | 5/2010 | Liu et al. |
| 2010/0132527 A1 | 6/2010 | Liu et al. |
| 2010/0224044 A1 | 9/2010 | Lee |
| 2010/0257990 A1 | 10/2010 | Schnell et al. |
| 2010/0269656 A1 | 10/2010 | Frovlov |
| 2010/0282039 A1 | 11/2010 | Jan |
| 2010/0319509 A1 | 12/2010 | Chuang |
| 2011/0011225 A1 | 1/2011 | Krapf et al. |
| 2011/0011231 A1 | 1/2011 | Frovlov |
| 2011/0023674 A1 | 2/2011 | Stasiewicz et al. |
| 2011/0039482 A1 | 2/2011 | Timmons |
| 2011/0041667 A1 | 2/2011 | Chiang |
| 2011/0048201 A1 | 3/2011 | Frovlov |
| 2011/0067540 A1 | 3/2011 | Frolov |
| 2011/0072943 A1 | 3/2011 | Chen |
| 2011/0072950 A1 | 3/2011 | Lannelli, Sr. |
| 2011/0100183 A1 | 5/2011 | Tomaino |
| 2011/0113939 A1 | 5/2011 | Simon |
| 2011/0146470 A1 | 6/2011 | Lin |
| 2011/0154967 A1 | 6/2011 | Chiu |
| 2011/0167976 A1 | 7/2011 | Liu |
| 2011/0198477 A1 | 8/2011 | Bergmann et al. |
| 2011/0203438 A1 | 8/2011 | Nenadic et al. |
| 2011/0271810 A1 | 11/2011 | Brown et al. |
| 2011/0296968 A1 | 12/2011 | Doumani |
| 2012/0006167 A1 | 1/2012 | Liu |
| 2012/0055307 A1 | 3/2012 | Burke et al. |
| 2012/0187272 A1 | 7/2012 | Lee |
| 2012/0216665 A1 | 8/2012 | Gass et al. |
| 2012/0222534 A1 | 9/2012 | Samprathi |
| 2012/0318940 A1 | 12/2012 | Chen |
| 2013/0098217 A1 | 4/2013 | Welsh et al. |
| 2013/0104717 A1 | 5/2013 | Rees |
| 2013/0154174 A1 | 6/2013 | Welsh et al. |
| 2014/0174273 A1 | 6/2014 | Frovlov |
| 2014/0182430 A1 | 7/2014 | Halder |
| 2014/0182434 A1 | 7/2014 | Frolov |
| 2014/0260859 A1 | 9/2014 | Doumani |
| 2014/0260869 A1 | 9/2014 | Frovlov |
| 2014/0261367 A1 | 9/2014 | Ipatenco et al. |
| 2014/0311312 A1 | 10/2014 | Frovlov et al. |
| 2014/0318342 A1 | 10/2014 | Koegel et al. |
| 2015/0020668 A1 | 1/2015 | Gass et al. |
| 2015/0020669 A1 | 1/2015 | Gass et al. |
| 2015/0040737 A1 | 2/2015 | Gass et al. |
| 2015/0107428 A1 | 4/2015 | Burke et al. |
| 2015/0107429 A1 | 4/2015 | Ceroll et al. |
| 2015/0107430 A1 | 4/2015 | Gass et al. |
| 2015/0151370 A1 | 6/2015 | Stasiewicz et al. |
| 2015/0165641 A1 | 6/2015 | Gass et al. |
| 2015/0183106 A1 | 7/2015 | Schnell et al. |
| 2015/0260869 A1 | 9/2015 | Payen et al. |
| 2015/0321271 A1 | 11/2015 | Nenadic et al. |
| 2015/0343662 A1 | 12/2015 | Aiken et al. |
| 2015/0367431 A1 | 12/2015 | Haidar |
| 2016/0067800 A1 | 3/2016 | Frovlov et al. |
| 2016/0067802 A1 | 3/2016 | Frovlov |
| 2016/0067880 A1 | 3/2016 | Frolov |
| 2016/0082529 A1 | 3/2016 | Gass et al. |
| 2016/0089809 A1 | 3/2016 | Cooley et al. |
| 2016/0121412 A1 | 5/2016 | Fulmer et al. |
| 2016/158959 A9 | 6/2016 | Gass et al. |
| 2016/0223130 A1 | 8/2016 | Chen et al. |
| 2016/0243632 A9 | 8/2016 | Fulmer et al. |
| 2016/0250746 A1 | 9/2016 | Welsh et al. |
| 2016/0332244 A1 | 11/2016 | Koegel |
| 2017/0087738 A1 | 3/2017 | O'Banion et al. |
| 2018/0015555 A1 | 1/2018 | Welsh et al. |
| 2018/0200918 A1 | 7/2018 | O'Banion et al. |

FOREIGN PATENT DOCUMENTS

| | | |
|---|---|---|
| CN | 2756420 | 2/2006 |
| CN | 1830634 | 9/2006 |
| CN | 201030506 | 3/2008 |
| CN | 201046517 | 4/2008 |
| CN | 100396987 | 6/2008 |
| CN | 201067860 | 6/2008 |
| CN | 201105344 | 8/2008 |
| CN | 201120639 | 9/2008 |
| CN | 101342677 | 1/2009 |
| CN | 201175941 | 1/2009 |
| CN | 101398121 | 4/2009 |
| CN | 101406972 | 4/2009 |
| CN | 101745692 | 6/2010 |
| CN | 101745960 | 6/2010 |
| CN | 201544103 | 8/2010 |
| CN | 102029562 | 4/2011 |
| CN | 202053121 | 11/2011 |
| CN | 102581883 | 7/2012 |
| CN | 102615338 | 8/2012 |
| CN | 102615340 | 8/2012 |
| CN | 102615341 | 8/2012 |
| CN | 102632479 | 8/2012 |
| CN | 102773558 | 11/2012 |
| CN | 202861959 | 4/2013 |
| CN | 203003256 | 6/2013 |
| CN | 203197885 | 9/2013 |
| CN | 203357138 | 12/2013 |
| CN | 203542570 | 4/2014 |
| CN | 203875992 | 10/2014 |
| CN | 204414058 | 6/2015 |
| DE | 3409731 | 8/1985 |
| DE | 3409730 | 9/1985 |
| DE | 8603369 | 4/1986 |
| DE | 3505645 | 8/1986 |
| DE | 4004705 | 8/1990 |
| DE | 4306763 | 9/1994 |
| DE | 4329410 | 3/1995 |
| DE | 29501506 | 3/1995 |

(56) References Cited

FOREIGN PATENT DOCUMENTS

| | | |
|---|---|---|
| DE | 29514074 | 10/1995 |
| DE | 4424615 | 1/1996 |
| DE | 19620323 | 10/1997 |
| DE | 19708466 | 10/1997 |
| DE | 29904915 | 8/1999 |
| DE | 29817589 | 2/2000 |
| DE | 202004009166 | 9/2004 |
| DE | 202004019137 | 5/2005 |
| DE | 202005006816 | 7/2005 |
| DE | 202005014115 | 1/2006 |
| DE | 102011085411 | 5/2013 |
| DE | 102013102091 | 9/2014 |
| EP | 0244203 | 11/1987 |
| EP | 0253032 | 1/1988 |
| EP | 0402297 | 12/1990 |
| EP | 0438611 | 7/1991 |
| EP | 0615815 | 9/1994 |
| EP | 0691180 | 1/1996 |
| EP | 1110651 | 6/2001 |
| EP | 1193036 | 4/2002 |
| EP | 1422033 | 5/2004 |
| EP | 1574276 | 9/2005 |
| EP | 1712335 | 10/2006 |
| EP | 2022585 | 2/2009 |
| EP | 2062699 | 5/2009 |
| EP | 2161091 | 3/2010 |
| EP | 2233237 | 9/2010 |
| EP | 2591898 | 5/2013 |
| EP | 2591899 | 5/2013 |
| EP | 2602075 | 6/2013 |
| EP | 2602076 | 6/2013 |
| EP | 2644303 | 10/2013 |
| FR | 1245976 | 10/1960 |
| GB | 116672 | 6/1918 |
| GB | 156045 | 1/1921 |
| GB | 159707 | 3/1921 |
| GB | 167779 | 12/1921 |
| GB | 1274335 | 5/1972 |
| GB | 2273078 | 6/1994 |
| GB | 2295987 | 6/1996 |
| GB | 2425281 | 10/2006 |
| JP | 2005-262337 A | 9/2005 |
| WO | WO9600638 | 1/1996 |
| WO | WO9619326 | 6/1996 |
| WO | WO2005016594 | 2/2005 |
| WO | WO2008085029 | 7/2008 |
| WO | WO2009033849 | 3/2009 |
| WO | WO2011033038 | 3/2011 |
| WO | WO2012163846 | 12/2012 |
| WO | WO2014151111 | 9/2014 |
| WO | WO2016085910 | 6/2016 |
| WO | WO2016089973 | 6/2016 |

OTHER PUBLICATIONS

Bosch, "GTS1031 Table Saw," Manual, 2011, 108 pages.
DeWalt, "DW745 Heavy-Duty 10" (254 mm) Compact Job Site Table Saw," Manual, 2006, 52 pages.
International Search Report and Written Opinion for Application No. PCT/US2018/035257 dated Sep. 21, 2018 (20 pages).
Australian Patent Office Exam Report No. 1 for Application No. 2018280028 dated Oct. 1, 2020 (7 pages).

* cited by examiner

TABLE SAW

CROSS-REFERENCE TO RELATED APPLICATIONS

This application is a continuation of U.S. patent application Ser. No. 15/947,985 filed on Apr. 9, 2018, now U.S. Pat. No. 10,792,834, the entire content of which is incorporated herein by reference.

FIELD OF THE INVENTION

The present invention relates generally to power tools, and in particular to improvements for power table saws.

BACKGROUND OF THE INVENTION

Table saws are commonly used power tools in the construction and wood working industries. When a saw blade of the table saw cuts a workpiece, the height and angle of the saw blade relative to the workpiece determines the depth and angle of cut into the workpiece. The height and orientation of the saw blade can be adjusted relative to a working surface of the table saw (and therefore the workpiece) through height and bevel adjustment mechanisms. Also, depending on the desired workpiece cutting operation, various components may be added or removed from the table saw to facilitate the cutting operation. Even further, the saw blade may be changed with a different saw blade depending upon the desired workpiece cutting operation or the material of the workpiece being cut.

SUMMARY OF THE INVENTION

The present invention provides, in another aspect, a table saw including a table, a spindle rotatably coupled to the table for driving a saw blade extending through an opening in the table, at least one flange plate coupled for co-rotation with the spindle for clamping the saw blade to the spindle, and an actuator movable relative to the spindle between a release position and a lockout position. In the release position, the actuator is disengaged from the spindle. In the lockout position, the actuator is engaged with the spindle or the flange plate to prevent rotation of the spindle to facilitate changing the saw blade. The table saw further includes a spring biasing the actuator toward the release position.

The present invention provides, in another aspect, a table saw including a table and a saw unit movably coupled underneath the table. The saw unit includes a spindle rotatably coupled to the table for driving a saw blade extending through an opening in the table and at least one flange plate coupled for co-rotation with the spindle for clamping the saw blade to the spindle. The table saw further includes a riving knife extending through the opening in the table and aligned with the saw blade extending through the opening, and a quick-release assembly selectively coupling the riving knife to the table. The quick-release assembly includes a mounting plate coupled to the table, a clamping plate that is movable relative to the mounting plate between a clamping position and a release position, a pin having a first end coupled for movement with the clamping plate, a handle pivotably coupled to a second end of the pin and including a cam portion engageable with the saw unit, wherein the clamping plate is movable between the clamping position and the release position in response to pivoting movement of the handle. In the clamping position, the riving knife can be clamped between the mounting plate and the clamping plate to secure the riving knife to the table. In the release position, the riving knife is releasable from the table. The table saw further includes an actuator movable relative to the spindle between a release position, in which the actuator is disengaged from the spindle, and a lockout position, in which the actuator is engaged with the spindle or the flange plate to prevent rotation of the spindle to facilitate changing the saw blade. The table saw further includes a spring biasing the actuator toward the release position.

The present invention provides, in another aspect, a table saw including a table, a saw unit movably coupled underneath the table, a riving knife extending through an opening in the table and aligned with a saw blade extending through the opening, and a quick-release assembly selectively coupling the riving knife to the table. The quick-release assembly includes a mounting plate coupled to the table, a clamping plate that is movable relative to the mounting plate between a clamping position and a release position, a pin having a first end coupled for movement with the clamping plate, and a handle pivotably coupled to a second end of the pin and having a cam portion engageable with the saw unit, wherein the clamping plate is movable between the clamping position and the release position in response to pivoting movement of the handle. In the clamping position, the riving knife can be clamped between the mounting plate and the clamping plate to secure the riving knife to the table. In the release position, the riving knife is releasable from the table. The table saw further includes a blade height adjustment mechanism operable to raise and lower the saw unit relative to the table. The blade height adjustment mechanism includes a first drive shaft defining a first rotational axis to which a first bevel gear is coupled for co-rotation, and a second drive shaft defining a second rotational axis to which a second bevel gear is coupled for co-rotation. The second rotational axis is perpendicular to the first rotational axis, and the second drive shaft is threaded to the saw unit such that rotation of the second drive shaft moves the saw unit in a direction parallel to the second rotational axis. The first and second bevel gears are meshed for transferring torque from the first drive shaft to the second drive shaft. A ratio of teeth on the second bevel gear to the teeth on the first bevel gear, respectively, is between about 0.5:1 and about 0.75:1.

The present invention provides, in another aspect, a table saw including a table and a saw unit movably coupled underneath the table. The saw unit includes a spindle rotatably coupled to the table for driving a saw blade extending through an opening in the table, and at least one flange plate coupled for co-rotation with the spindle for clamping the saw blade to the spindle. The table saw further includes a blade height adjustment mechanism operable to raise and lower the saw unit relative to the table. The blade height adjustment mechanism includes a first drive shaft defining a first rotational axis to which a first bevel gear is coupled for co-rotation, and a second drive shaft defining a second rotational axis to which a second bevel gear is coupled for co-rotation. The second rotational axis is perpendicular to the first rotational axis, and the second drive shaft is threaded to the saw unit such that rotation of the second drive shaft moves the saw unit in a direction parallel to the second rotational axis. the first and second bevel gears are meshed for transferring torque from the first drive shaft to the second drive shaft. A ratio of teeth on the second bevel gear to the teeth on the first bevel gear, respectively, is between about 0.5:1 and about 0.75:1. The table saw further includes an actuator movable relative to the spindle between a release position, in which the actuator is disengaged from the spindle, and a lockout position, in which the actuator is engaged with the spindle or the flange plate to prevent rotation of the spindle to facilitate changing the saw blade. The table saw further includes a spring biasing the actuator toward the release position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
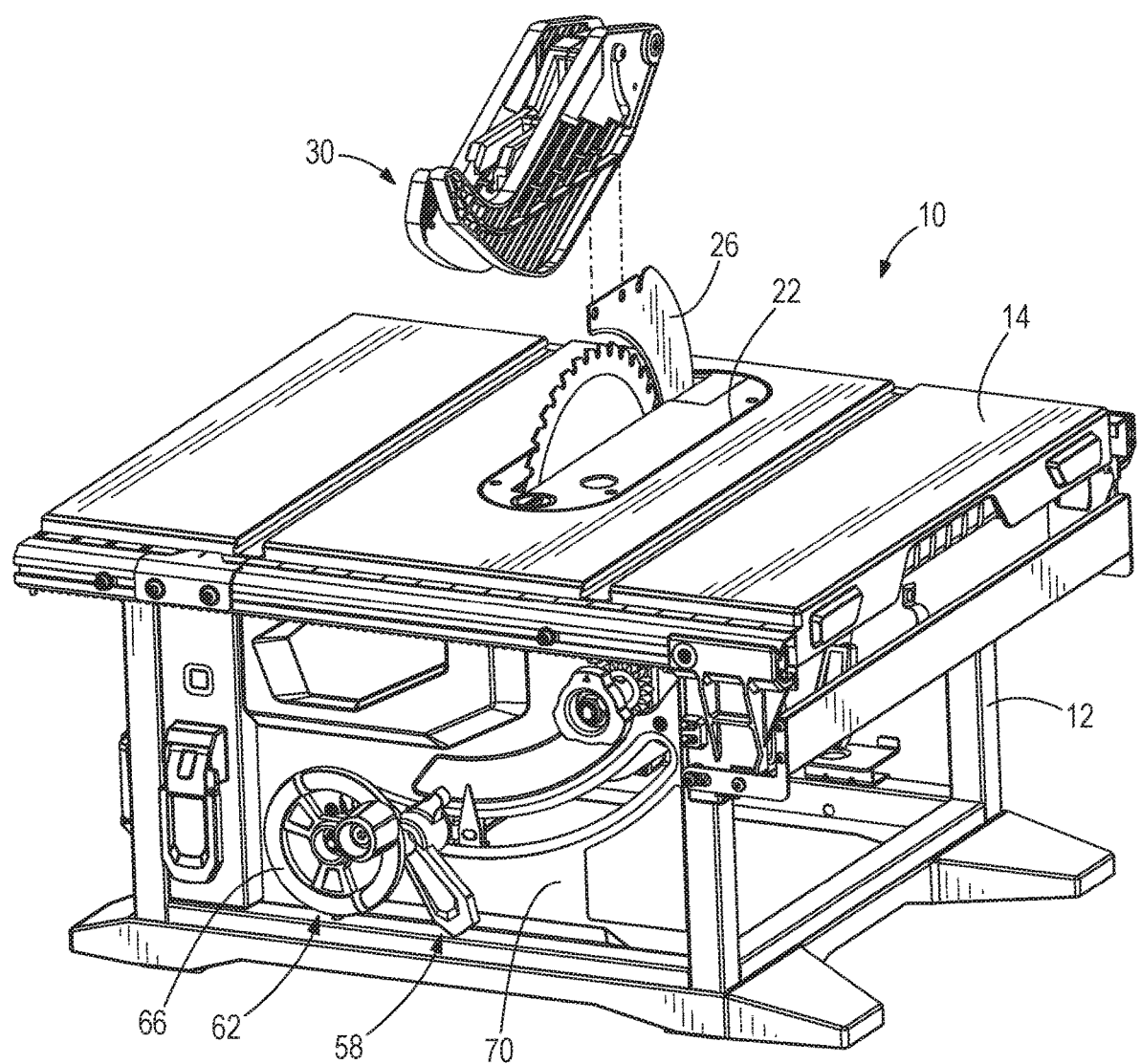
FIG. 1 is a front perspective view of a table saw in accordance with an embodiment of the present invention.

With reference to FIG. 1, a table saw 10 includes a tubular base 12, a table 14 atop the base 12 upon which a workpiece is supported, and a saw blade 18 protruding through an opening 22 in the table 14. The table saw 10 also includes a riving knife 26 positioned behind the saw blade 18 and a blade guard assembly 30 supported by the riving knife 26 for covering the top and opposite sides of the saw blade 18.

Figure 3:
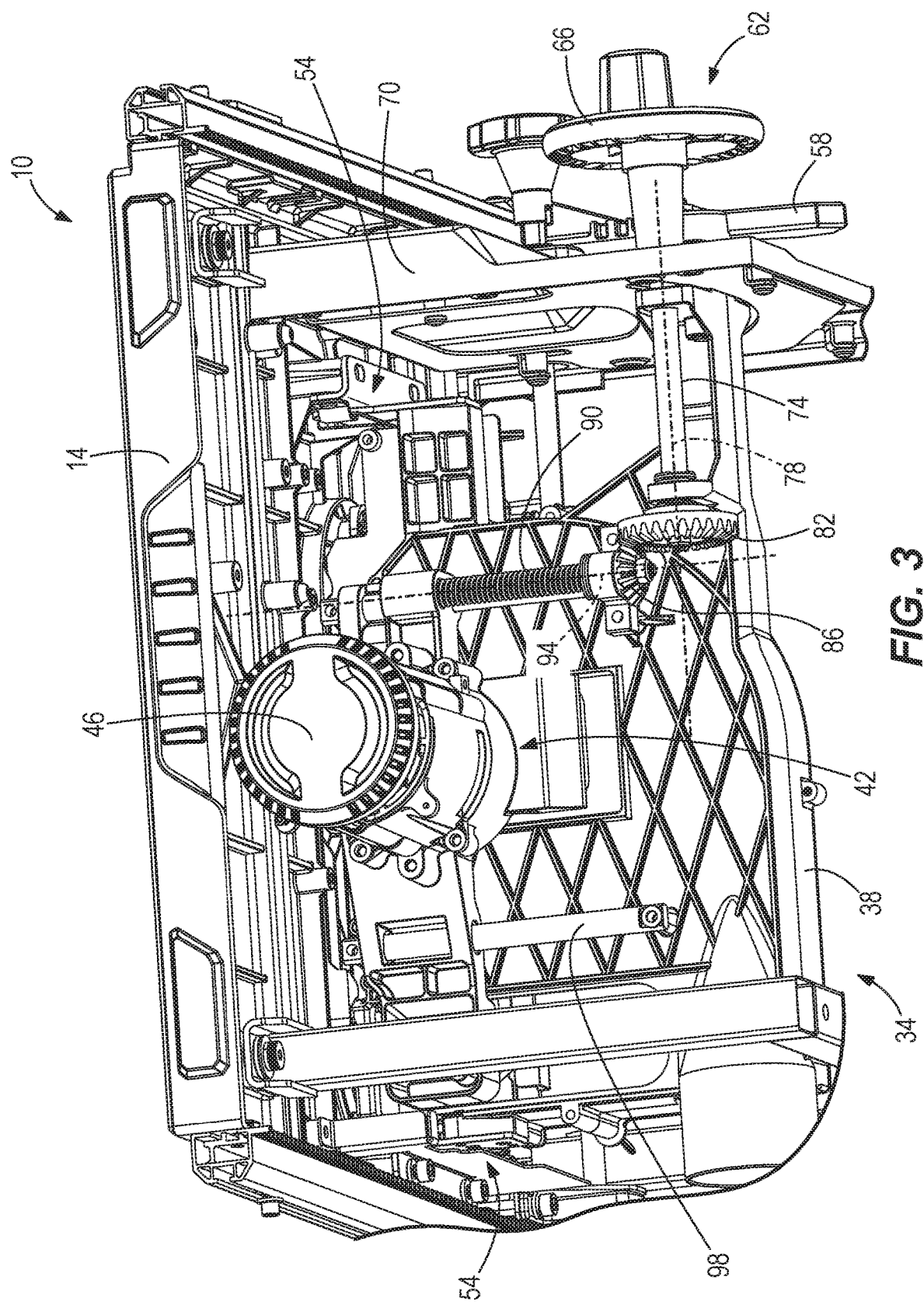
FIG. 3 is a bottom perspective view of the table saw of FIG. 1, illustrating an undercarriage and a blade height adjustment mechanism.

With reference to FIG. 3, the table saw 10 also includes an undercarriage 34 pivotably coupled to a bottom surface of the table 14. The undercarriage 34 includes a dust shroud 38 for directing saw dust and other debris away from the table saw 10 and a saw unit 42 supported by the dust shroud 38. The saw unit 42 includes a motor 46, a spindle 50 (FIG. 5) driven by the motor 46, and the saw blade 18, which is coupled for co-rotation with the spindle 50. The undercarriage 34 is pivotably coupled to the table 14 by a pair of pivot brackets 54 (FIG. 3), allowing the undercarriage 34 to be pivoted to various bevel angles relative to the table 14. The table saw 10 further includes a bevel angle adjustment mechanism 58 operable to adjust and selectively maintain the undercarriage 34, and therefore the saw unit 42, at a user-selected bevel angle relative to the table 14.

Figure 4:
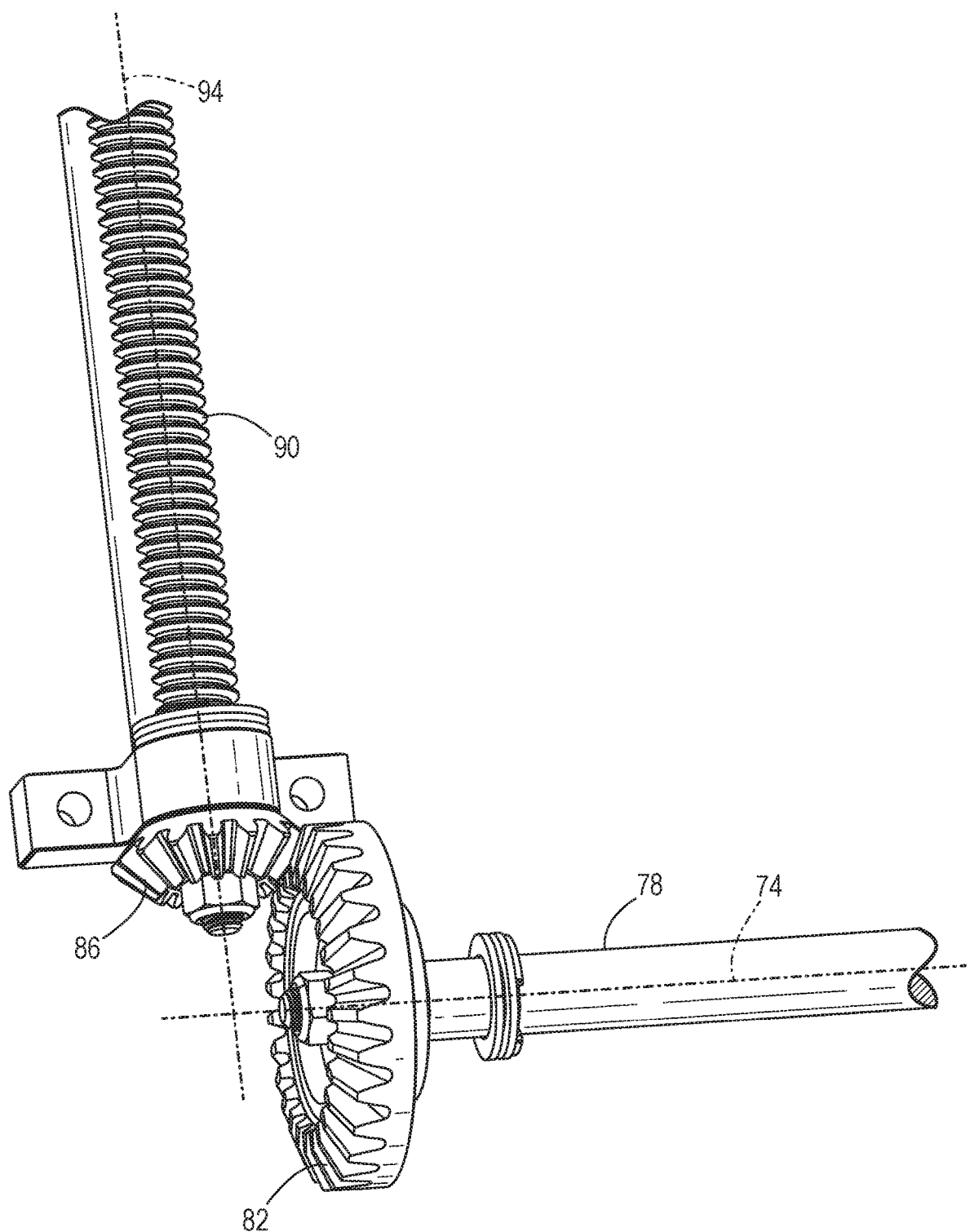
FIG. 4 is an enlarged view of a portion of the blade height adjustment mechanism of FIG. 3.

With reference to FIGS. 3 and 4, the table saw 10 further includes a blade height adjustment mechanism 62 operable to raise and lower the saw unit 42 relative to the table 14. The blade height adjustment mechanism 62 includes a crank 66 that is disposed in front of a front panel 70 of the base 12. The crank 66 is rotatable about a first rotational axis 74 for driving a first drive shaft 78 and a first bevel gear 82 coupled for co-rotation with the first drive shaft 78. The blade height adjustment mechanism 62 also includes a second bevel gear 86 that is intermeshed with and driven by the first bevel gear 82. The second bevel gear 86 is coupled for co-rotation with a second drive shaft 90, which is rotatable about a second rotational axis 94 that is perpendicular to the first rotational axis 74. As illustrated in FIG. 4, the second drive shaft 90 includes external threads engaged with corresponding internal threads on the saw unit 42.

With continued reference to FIGS. 3 and 4, when the second drive shaft 90 rotates about the second rotational axis 94, the saw unit 42 translates along the second drive shaft 90 in a direction parallel to the second rotational axis 94. The blade height adjustment mechanism 62 further includes a support shaft 98 (FIG. 3) parallel with the second drive shaft 90 for guiding translation of the saw unit 62. However, the support shaft 98 is cylindrical and non-threaded, permitting the saw unit 42 to slide along the support shaft 98 when the crank 66, and therefore the drive shafts 78, 90 and bevel gears 82, 86, are rotated. To adjust the height of the saw unit 42 relative to the table 14, an operator would rotate the crank 66 about the first rotational axis 74. When the crank 66 is rotated, for example, in a clockwise direction, the saw unit 42 moves upwardly relative to the table 14. In contrast, when the crank 66 is rotated, for example, in a counter-clockwise direction, the saw unit 42 moves downwardly relative to the table 14.

As shown in FIG. 4, the first (input) bevel gear 82 has a greater number of teeth than the second (output) bevel gear 86, thereby providing a gear ratio between the bevel gears 82, 86 that is less than 1:1. In other words, to achieve one complete revolution of the second drive shaft 90 and second bevel gear 86, less than one complete revolution of the first drive shaft 78 and the first bevel gear 82 is required. Specifically, the ratio of teeth on the second bevel gear 86 to the teeth on the first bevel gear 82 is between about 0.5:1 and about 0.75:1. More specifically, the ratio of teeth on the second bevel gear 86 to the teeth on the first bevel gear 82 is approximately 0.52:1. This enables the saw unit 42 to be raised and lowered relative to the table 14 with fewer rotations of the crank 66 compared to a conventional table saw.

Figure 2:
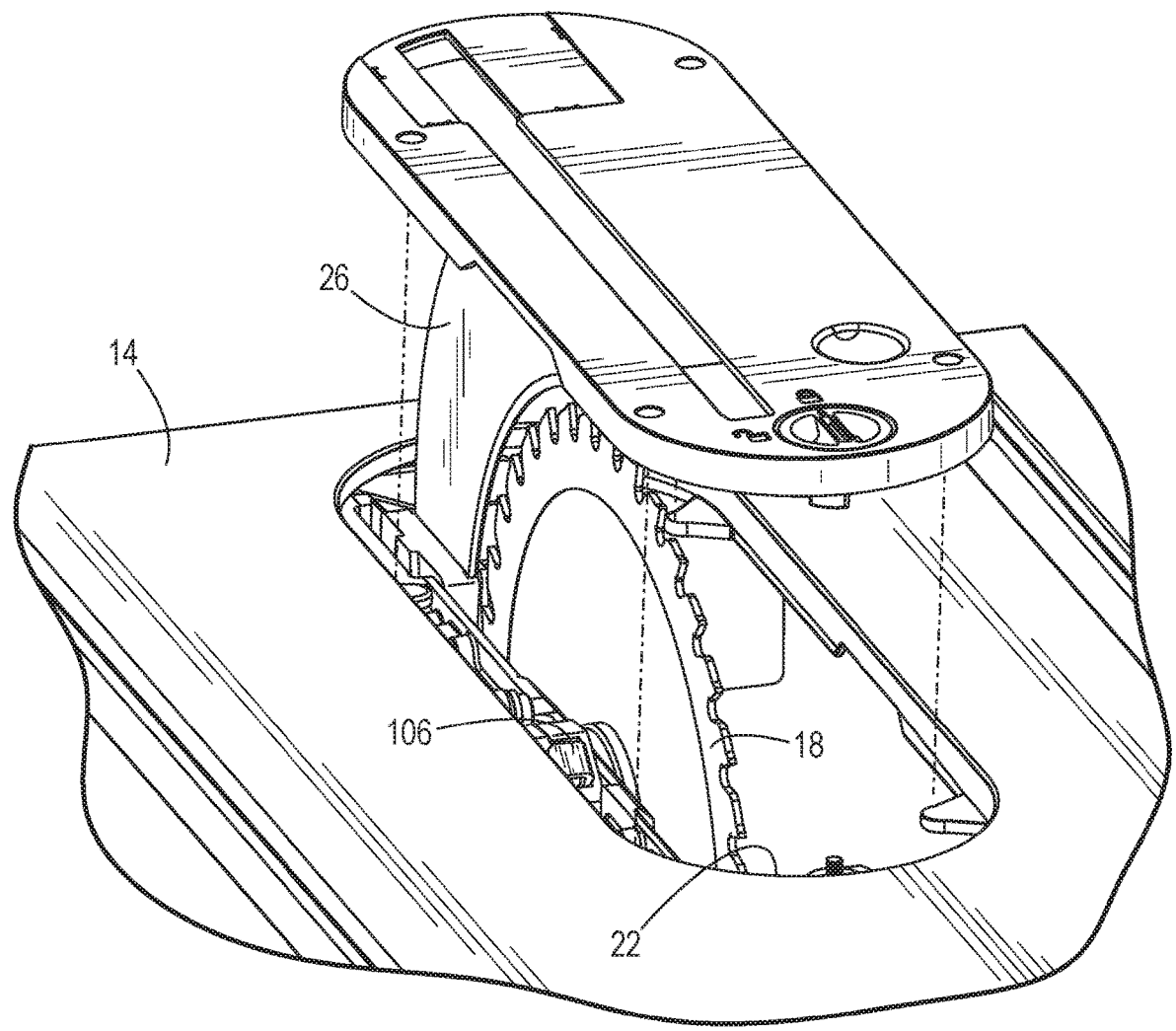
FIG. 2 is a front perspective view of the table saw of FIG. 1, illustrating a throat plate exploded from an opening of the table saw.
Figure 6:
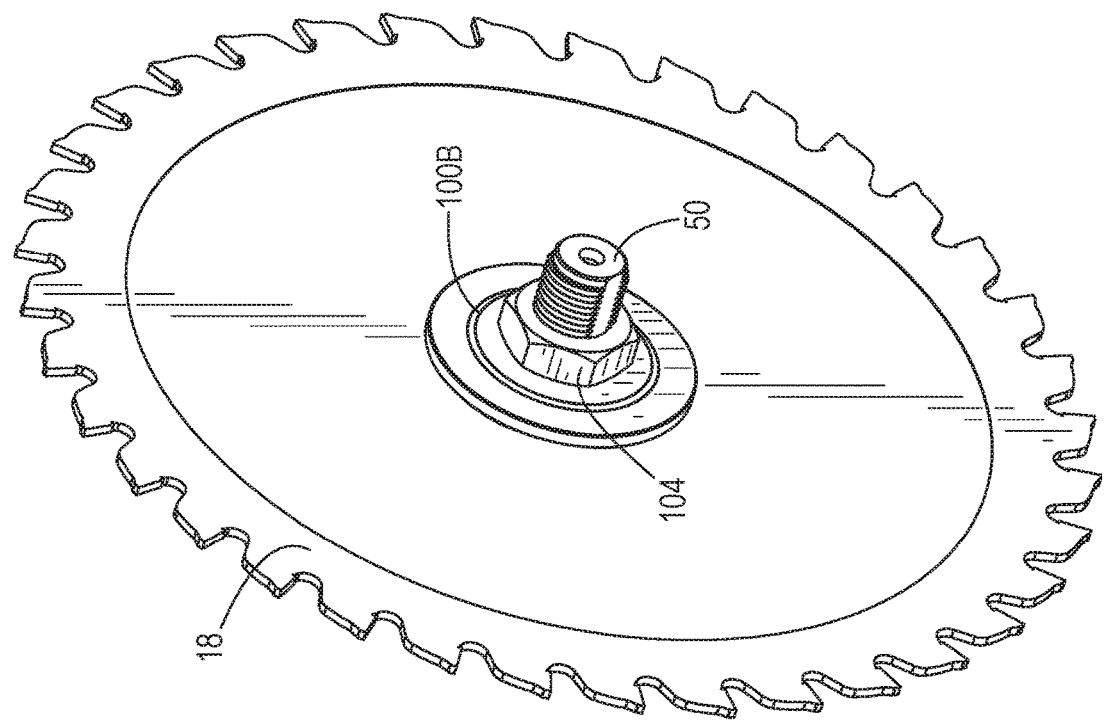
FIG. 6 is a front right-side perspective view of the saw blade and the spindle assembly of FIG. 5.
Figure 5:
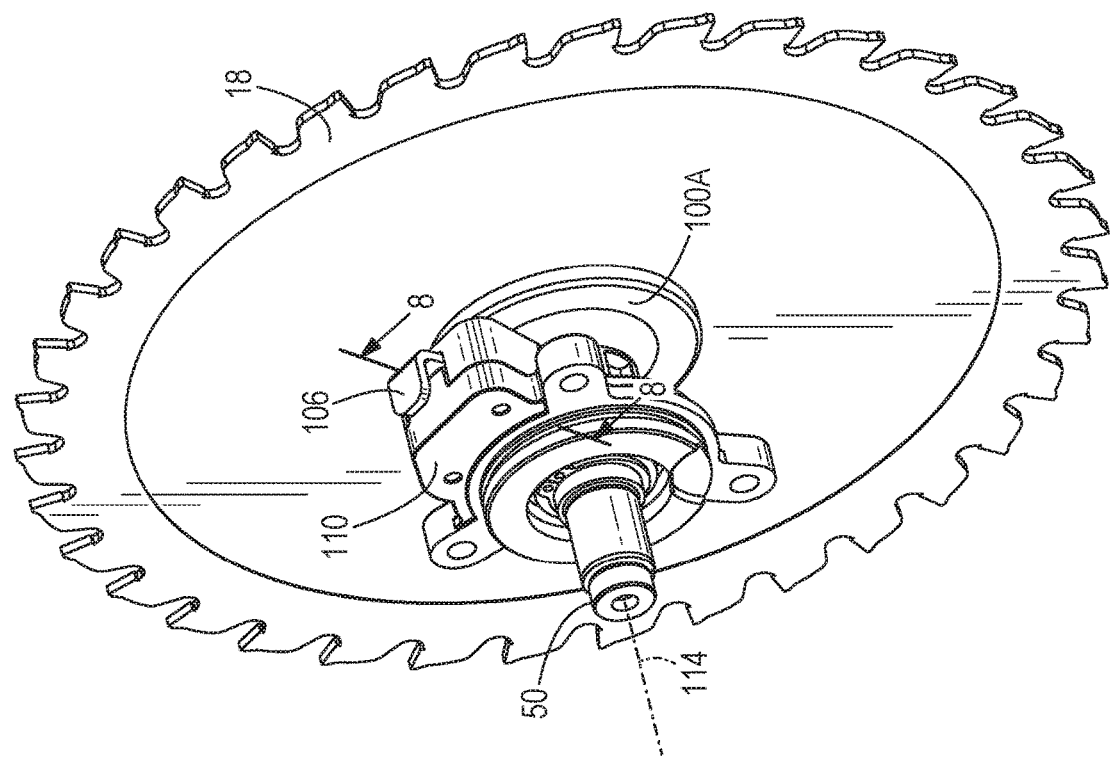
FIG. 5 is a front left-side perspective view of a saw blade and a spindle assembly of the table saw of FIG. 1.
Figure 7:
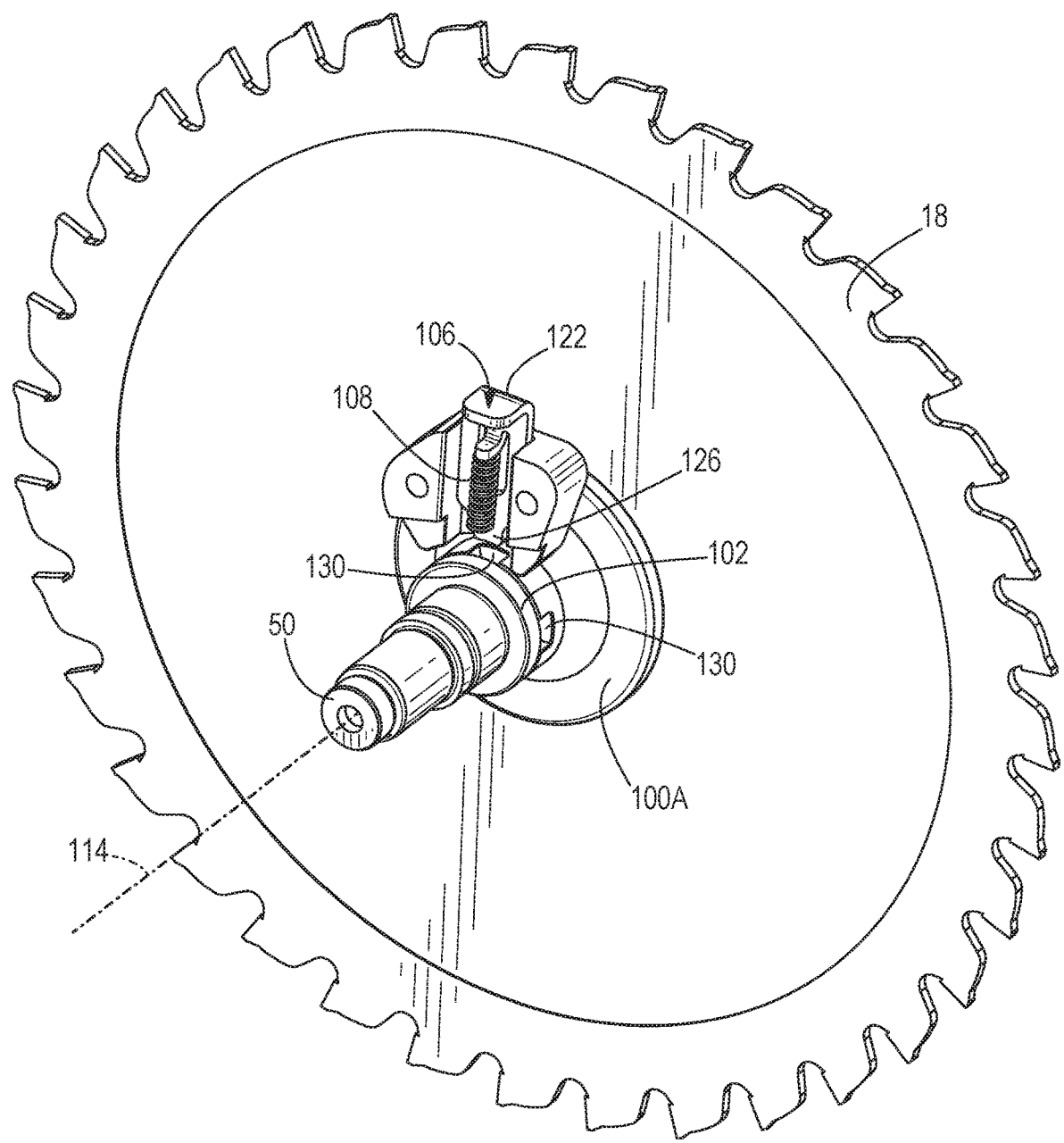
FIG. 7 is a perspective view of the saw blade and the spindle assembly of FIG. 5, with portions removed.
Figure 7A:
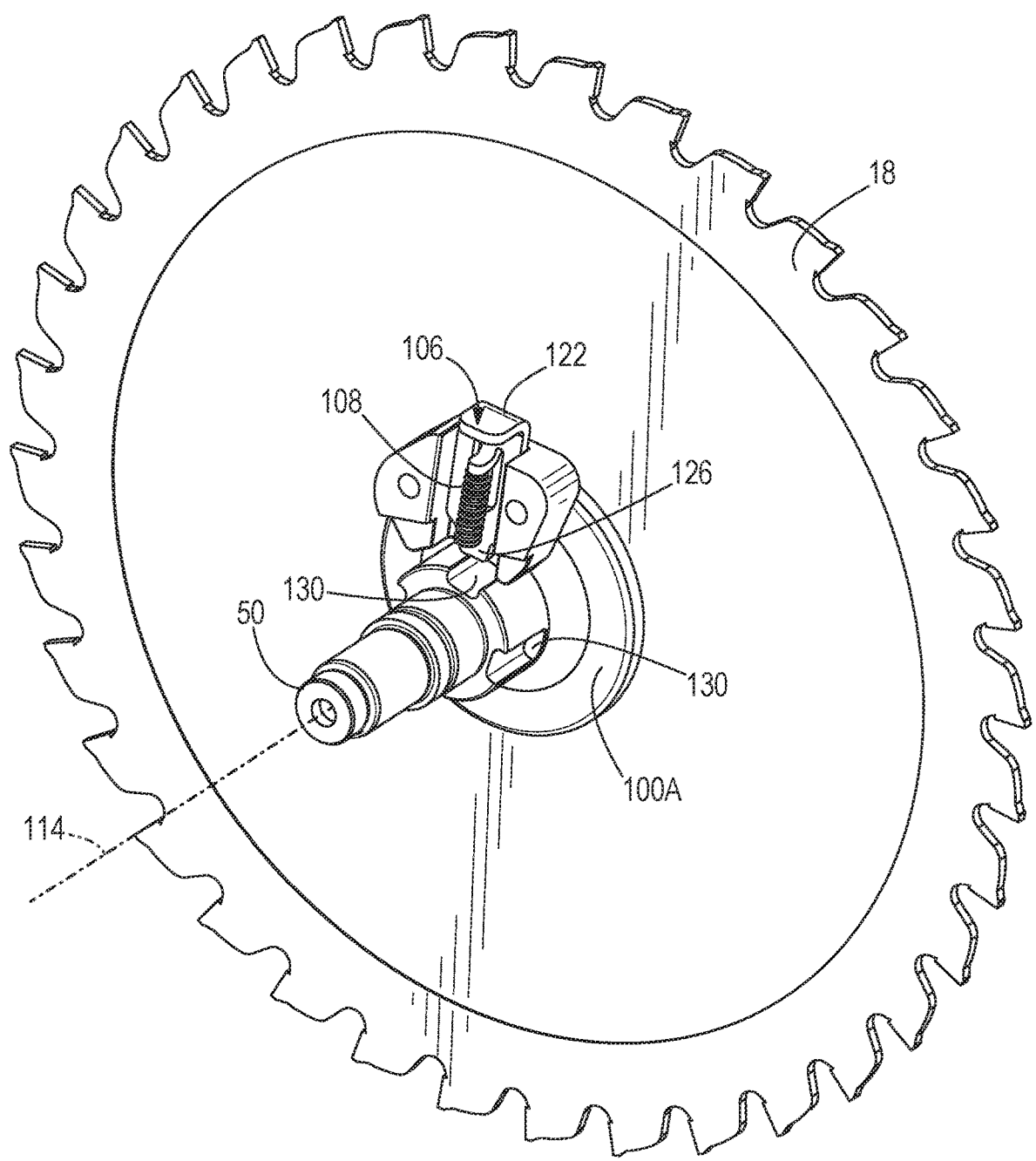
FIG. 7A a perspective view of a saw blade and a spindle assembly in accordance with another embodiment of the present invention.

With reference to FIGS. 5-8, the saw blade 18 is clamped between opposed flange plates 100A, 100B coupled for co-rotation with the spindle 50. As shown in FIG. 7, the flange plate 100A is axially abutted with an integral flange 102 on the spindle 50. However, the flange plate 100A may alternatively be integrally formed with the flange 102 as a single piece, as shown in FIG. 7A. In either embodiment, the spindle 50 includes a threaded end to receive a nut 104, which secures the flange plate 100B to the spindle 50 (FIG. 6). With reference to FIGS. 5 and 7, an actuator 106 is slidably supported for movement via a first bracket 110, which is fastened to the saw unit 42, relative to the spindle 50 in a transverse direction to a longitudinal axis 114 of the spindle 50. Specifically, the actuator 106 is movable between a lockout position (shown as phantom lines in FIG. 8) and a release position (shown as solid lines in FIG. 8) along an actuator axis 116 that is transverse relative to a longitudinal axis 114 of the spindle 50. The actuator 106 is accessible through the opening 22 in the table 14 when a throat plate of the table saw 10 is removed, as shown in FIG. 2. The actuator 106 is biased by a compression spring 108 (FIG. 8) away from the spindle 50 toward the release position. The actuator 106 also includes a tab 122 extending from the first bracket 110 that may be pressed by an operator of the table saw 10 to displace the actuator 106 toward the lockout position, causing a protrusion 126 of the actuator 106 to be received in one of multiple slots 130 in the flange plate 100A adjacent the spindle flange 102. In this manner, rotation of the spindle 50 may be locked to permit the table saw 10 operator to unthread the nut 104 from the spindle 50 to change or remove the saw blade 18. The actuator 106 further includes a finger 124 extending away from the actuator axis 116 against which the spring 108 abuts, as described in further detail below.

Figure 8:
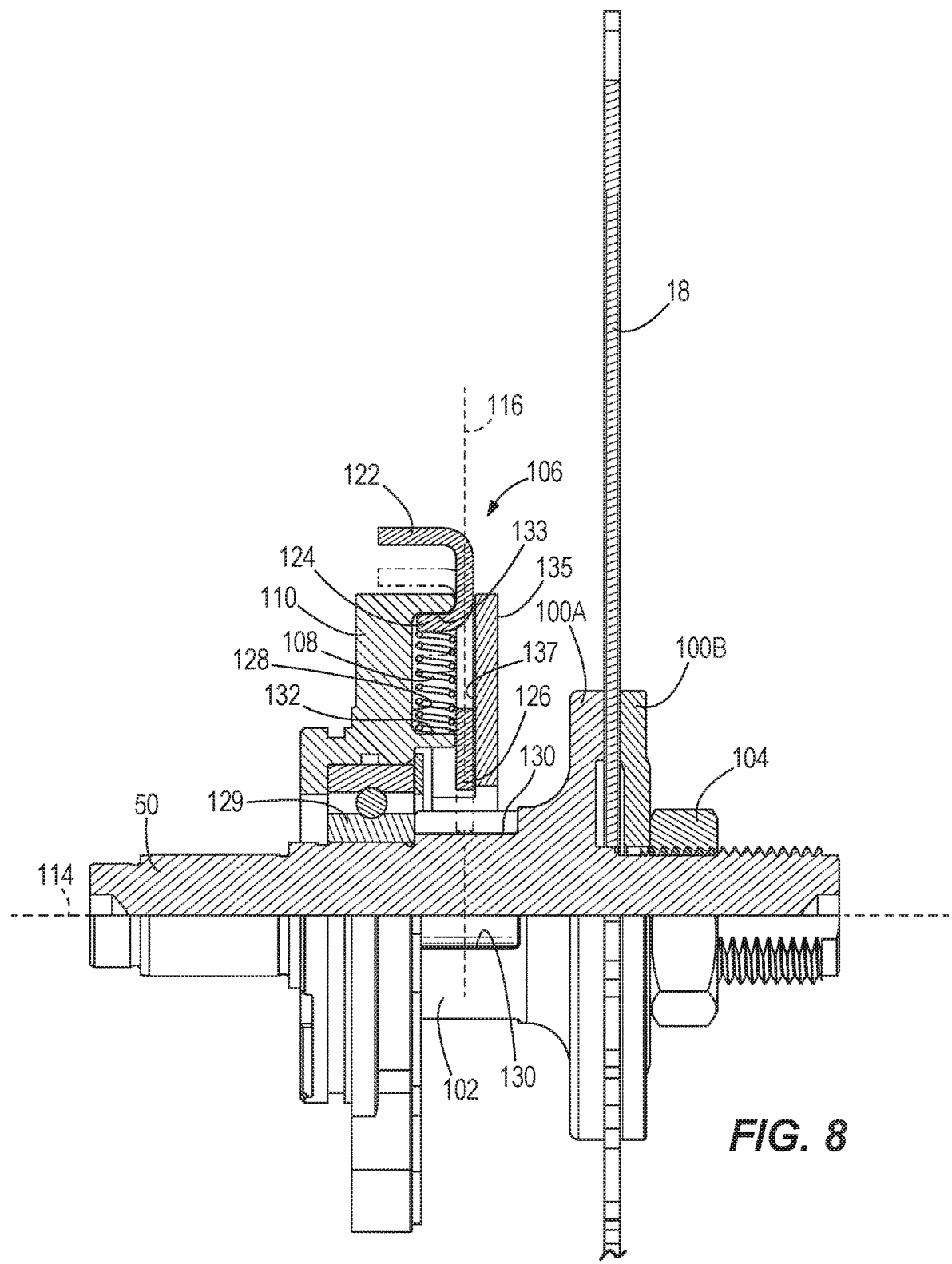
FIG. 8 is a partial cross-section view along line 8-8 of the spindle assembly of FIG. 5.

With continued reference to FIG. 8, the first bracket 110 rotatably supports the spindle 50 relative to the table 14 via bearing 129. The first bracket 110 defines a pocket 128 in which the spring 108 is at least partially positioned. As illustrated, the spring 108 is interposed between a bottom surface 132 of the pocket 128 and the finger 124 of the actuator 106. The finger 124 is abutted against a top surface 133 of the pocket 128 when the actuator 106 is in the release position, preventing further upward movement of the actuator 106. The table saw 10 further includes a second bracket 135 attached to the first bracket 110 between which the actuator 106 is held. The second bracket 135 defines a slot 137 that laterally constrains movement of the actuator 106, limiting movement of the actuator between the release position and the lockout position to translation within the slot 137 along the axis 116.

Figure 9:
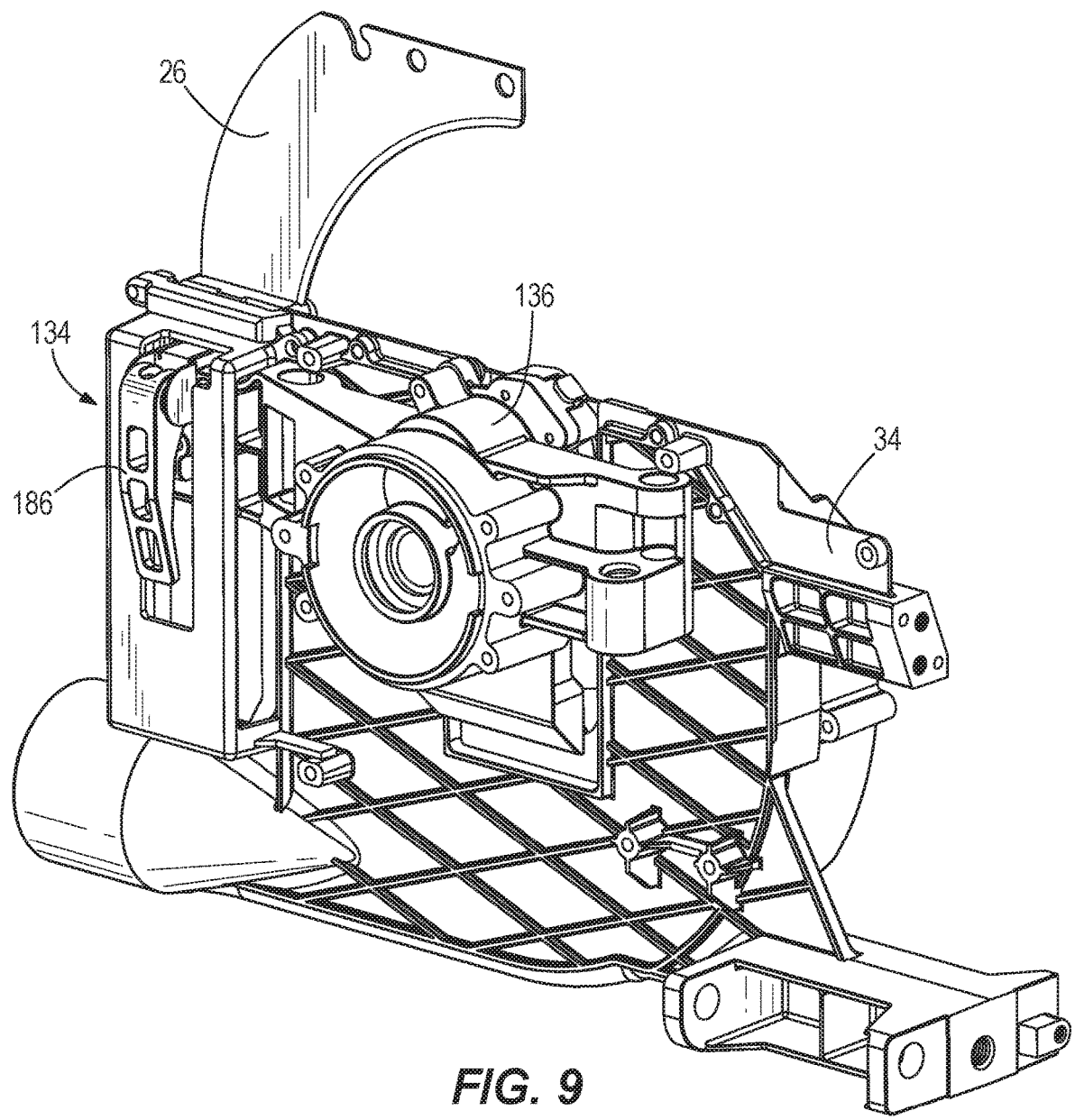
FIG. 9 is a perspective view of the undercarriage of the table saw of FIG. 1.
Figure 10:
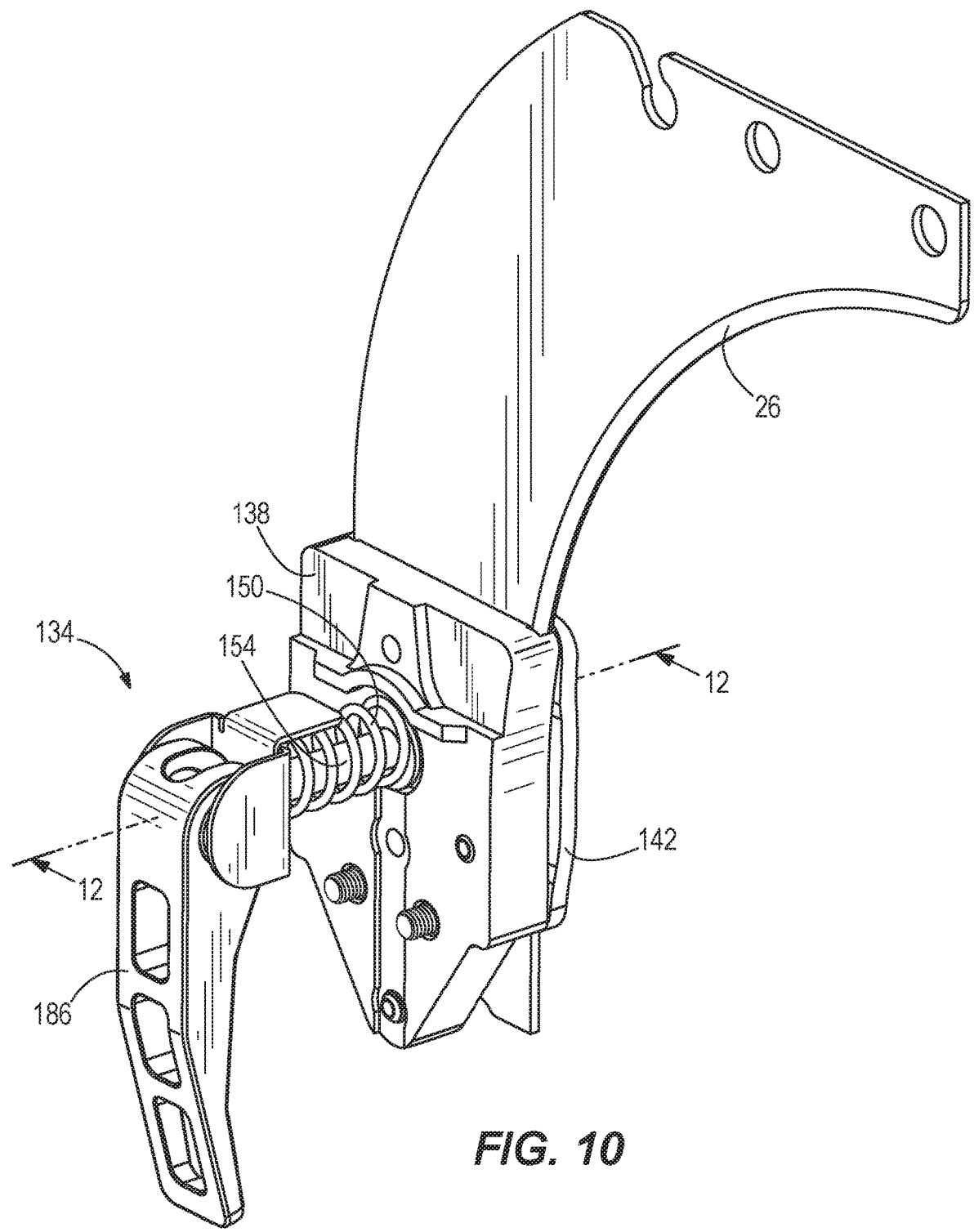
FIG. 10 is a perspective view of a quick-release mechanism for a riving knife of the table saw of FIG. 1.

With reference to FIG. 9, the table saw 10 further includes a quick-release assembly 134 for attaching and detaching the riving knife 26, to which the blade guard assembly 30 is attached, relative to the table 14. The quick-release assembly 134 is mounted to a frame 136 of the saw unit 42. Therefore, the quick-release assembly 134, along with the attached riving knife 26 and blade guard assembly, are vertically and angularly adjustable relative to the table 14 in unison with the saw unit 42.

Figures 11, 12:
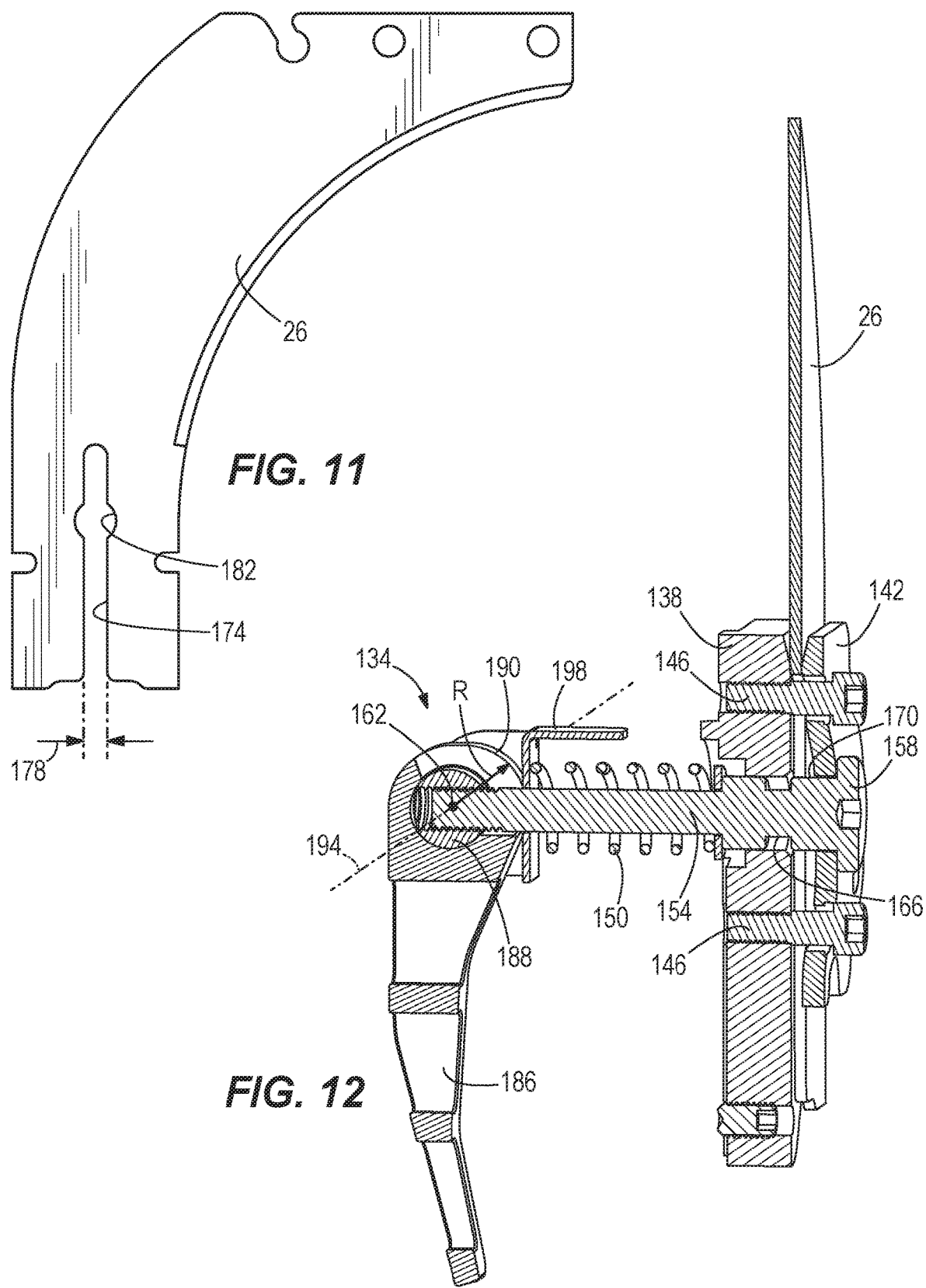
FIG. 11 is a side view of the riving knife of FIG. 10.
FIG. 12 is a cross-sectional view along line 12-12 of FIG. 10, illustrating the quick-release mechanism in a first position.

With reference to FIGS. 10-13, the quick-release assembly 134 includes a mounting plate 138 fastened to the saw unit frame 136 for movement therewith and a clamping plate 142 slidable along parallel fasteners 146 (FIGS. 12 and 13) anchored to the mounting plate 138 relative to (i.e., toward and away from) the mounting plate 138. The quick-release assembly 134 also includes a pin 154 having a first end 158 attached to the clamping plate 142 for movement therewith and an opposite second end 162 protruding through the mounting plate 138. The pin 154 includes a reduced-diameter section 166 (FIGS. 12 and 13) and an adjacent cylindrical section 170, which is adjacent the clamping plate 142. As illustrated in FIG. 11, the riving knife 26 includes a vertical slot 174 having a width 178 less than the diameter of the cylindrical section 170 of the pin 154 but greater than the reduced-diameter section 166, and a single aperture 182 coexistent with the slot 174 that has a nominally larger diameter than the cylindrical section 170 of the pin 154. The quick-release assembly 134 also includes a compression spring 150 biasing the pin 154 and the attached clamping plate 142 toward a release position, described in detail below, relative to the riving knife 26.

Figure 13:
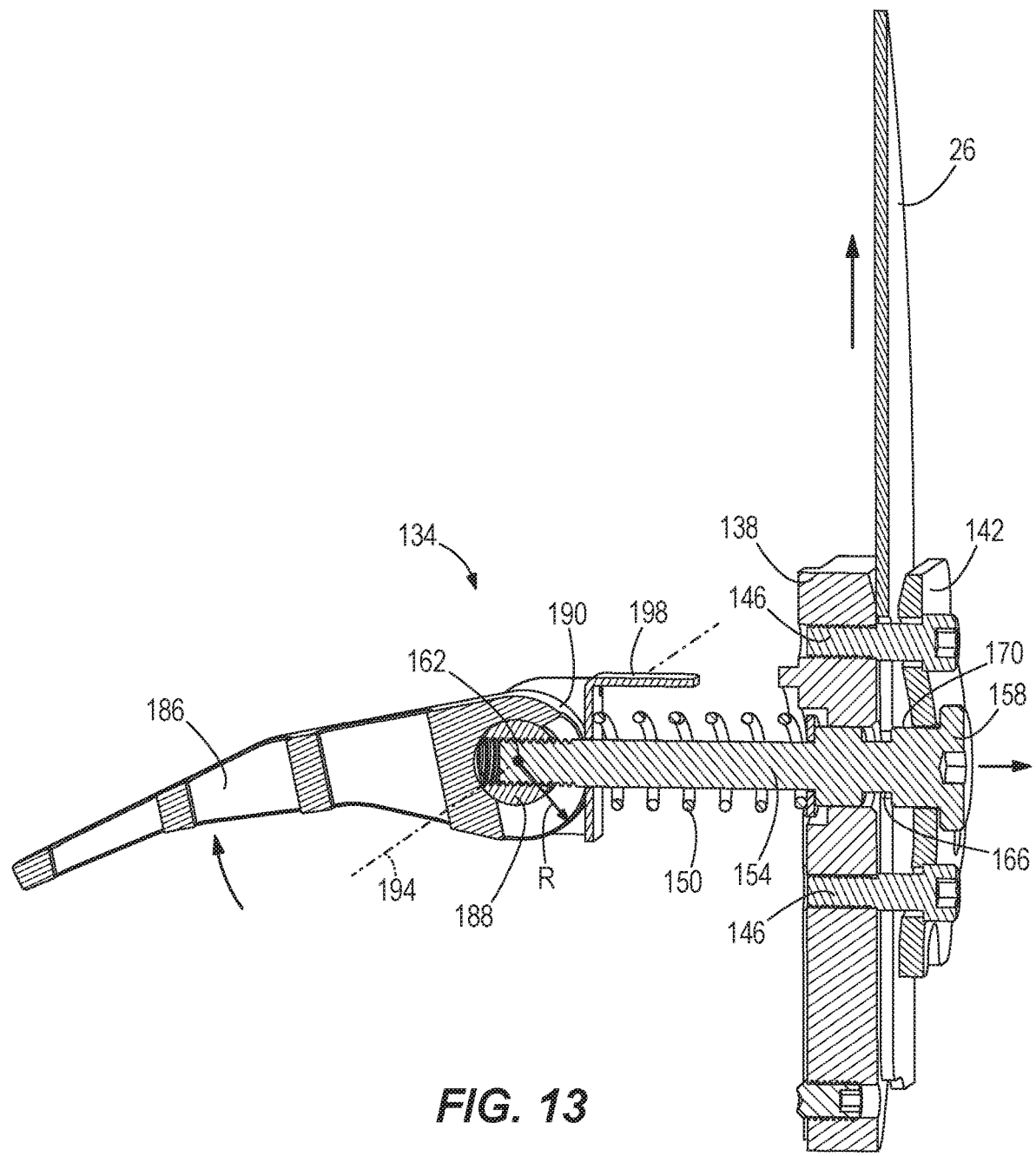
FIG. 13 is a cross-sectional view along line 12-12 of FIG. 10, illustrating the quick-release mechanism in a second position.

With reference to FIGS. 12 and 13, the quick-release assembly 134 further includes a handle 186 having a cam surface 190. The end 162 of the pin 154 is threaded to a barrel nut 188 within the handle, thereby pivotably coupling the pin 154 to the handle 186 about a pivot axis 194. The cam surface 190 is in sliding contact with an intermediate bracket 198 which, in turn, is stationary and mounted to the saw unit frame 136. The cam surface 190 defines a progressively changing radius of contact R between the pivot axis 194 and the bracket 198, thereby imparting translation to the pin 154 (thus causing spring 150 to compress) as the handle 186 is rotated in a direction coinciding with an increasing radius of contact R. Likewise, as the handle 186 is rotated in an opposite direction coinciding with a decreasing radius of contact R, the spring 150 rebounds, pushing the pin 154 in an opposite direction.

When the pin 154 and the attached clamping plate 142 are located in a clamping position coinciding with a relatively large radius of contact R of the cam surface 190 (FIG. 12), the cylindrical section 170 of the pin 154 is received in the aperture 182 in the riving knife 26, thereby locking the riving knife 26 to the mounting plate 138 and the saw unit frame 136. Also when the pin 154 and the clamping plate 142 are in the clamping position, the clamping plate 142 is pressed against the riving knife 26 to exert a clamping force against the riving knife 26 and the mounting plate 138. To remove the riving knife 26, the handle 186 is pivoted away from the saw unit frame 136, decreasing the radius of contact R and allowing the spring 150 to rebound and translate the pin 154 (with the attached clamping plate 142) toward the release position shown in FIG. 13. In the release position, the reduced-diameter section 166 of the pin 154 is aligned with the slot 174 and the cylindrical section 170 is displaced from the aperture 182. And, the clamping plate 142 is displaced from the mounting plate 138, thereby removing the clamping force from the riving knife 26. Thereafter, the riving knife 26 may be pulled upward and removed from the table 14. Reattachment of the riving knife 26 is done using the reverse procedure. Friction between the cam surface 190 and the intermediate bracket 198 prevents the handle 186 from inadvertently moving from the position shown in FIG. 12 coinciding with the clamping position of the pin 154 to the position shown in FIG. 13 coinciding with the release position of the pin 154.

Various features of the invention are set forth in the following claims.

What is claimed is:

1. A table saw comprising:
   a table for supporting a workpiece to be cut;
   a spindle rotatably coupled to the table about a longitudinal axis for driving a saw blade extending through an opening in the table;
   at least one flange plate coupled for co-rotation with the spindle for clamping the saw blade to the spindle;
   an actuator movable relative to the spindle between a release position, in which the actuator is disengaged from the spindle, and a lockout position, in which the actuator is engaged with the spindle or the flange plate to prevent rotation of the spindle to facilitate changing the saw blade;
   a spring biasing the actuator toward the release position; and a bracket rotatably supporting the spindle relative to the table via a bearing, wherein the bracket defines a pocket in which the spring is at least partially positioned, wherein the actuator is slidable relative to the spindle along an axis that is transverse relative to the longitudinal axis of the spindle, wherein the actuator is positioned underneath the table, and wherein the actuator is accessible through the opening in the table.

2. The table saw of claim 1, wherein the actuator includes a protrusion on a first end thereof that is engageable with the spindle or flange plate when in the lockout position.

3. The table saw of claim 2, wherein the actuator includes a tab on a second end thereof that is user-manipulable to displace the actuator from the release position toward the lockout position.

4. The table saw of claim 3, wherein the tab is oriented transverse to the actuator axis.

5. The table saw of claim 3, wherein at least a portion of the tab of the actuator overlaps a bearing of the spindle in a direction perpendicular to the longitudinal axis of the spindle.

6. The table saw of claim 2, wherein the protrusion is receivable in one of multiple slots defined in the spindle or the flange plate to lock rotation of the spindle.

7. The table saw of claim 1, wherein a first end of the spring is seated against a bottom surface of the pocket, and wherein a second end of the spring is seated against a portion of the actuator.

8. The table saw of claim 7, wherein the actuator includes a finger extending away from the actuator axis against which the second end of the spring is seated.

9. The table saw of claim 8, wherein the finger is abutted against a top surface of the pocket when the actuator is in the release position.

10. The table saw of claim 1, wherein the bracket is a first bracket, and wherein the table saw further comprises a second bracket attached to the first bracket between which the actuator is held.

11. The table saw of claim 10, wherein at least one of the first bracket or second bracket defines a slot in which the actuator is slidable relative to the spindle between the release position and the lockout position.

12. The table saw of claim 1, wherein the actuator includes a protrusion on a first end thereof, and wherein the protrusion is receivable in one of multiple slots defined in the spindle or the flange plate to lock rotation of the spindle, wherein the slots abut the bearing.

13. A table saw comprising:
a table for supporting a workpiece to be cut;
a saw unit movably coupled underneath the table, the saw unit including
a spindle rotatably coupled to the table about a longitudinal axis for driving a saw blade extending through an opening in the table, and
at least one flange plate coupled for co-rotation with the spindle for clamping the saw blade to the spindle;
a riving knife extending through the opening in the table and aligned with the saw blade extending through the opening;
a quick-release assembly selectively coupling the riving knife to the table, the quick-release assembly including
a mounting plate coupled to the table,
a clamping plate that is movable relative to the mounting plate between a clamping position, in which the riving knife can be clamped between the mounting plate and the clamping plate to secure the riving knife to the table, and a release position, in which the riving knife is releasable from the table,
a pin having a first end coupled for movement with the clamping plate, and
a handle pivotably coupled to a second end of the pin and including a cam portion engageable with the saw unit, wherein the clamping plate is movable between the clamping position and the release position in response to pivoting movement of the handle;
an actuator movable relative to the spindle between a release position, in which the actuator is disengaged from the spindle, and a lockout position, in which the actuator is engaged with the spindle or the flange plate to prevent rotation of the spindle to facilitate changing the saw blade;
a spring biasing the actuator toward the release position; and
a bracket rotatably supporting the spindle relative to the table via a bearing, wherein the bracket defines a pocket in which the spring is at least partially positioned,
wherein the actuator is slidable relative to the spindle along an axis that is transverse relative to the longitudinal axis of the spindle,
wherein the actuator is positioned underneath the table, and
wherein the actuator is accessible through the opening in the table.

14. The table saw of claim 13, further comprising:
a blade height adjustment mechanism operable to raise and lower the saw unit relative to the table, the blade height adjustment mechanism including
a first drive shaft defining a first rotational axis to which a first bevel gear is coupled for co-rotation, and
a second drive shaft defining a second rotational axis to which a second bevel gear is coupled for co-rotation,
wherein the second rotational axis is perpendicular to the first rotational axis, wherein the second drive shaft is threaded to the saw unit such that rotation of the second drive shaft moves the saw unit in a direction parallel to the second rotational axis,
wherein the first and second bevel gears are meshed for transferring torque from the first drive shaft to the second drive shaft, and wherein a ratio of teeth on the second bevel gear to the teeth on the first bevel gear, respectively, is between about 0.5:1 and about 0.75:1.

15. The table saw of claim 13, wherein the actuator includes a protrusion on a first end thereof, and wherein the protrusion is receivable in one of multiple slots defined in the spindle or the flange plate to lock rotation of the spindle, wherein the slots abut the bearing.

16. The table saw of claim 13, wherein the actuator includes a protrusion on a first end and a tab on a second end that is user-manipulable to displace the actuator, wherein at least a portion of the tab of the actuator overlaps a bearing of the spindle in a direction perpendicular to the longitudinal axis of the spindle.

* * * * *